March 31, 1964 B. RABINOVICI 3,127,525
CASCADED TUNNEL DIODES WITH MEANS TO APPLY ADVANCE AND RESET PULSES TO DIFFERENT TERMINALS
Filed July 14, 1961 2 Sheets-Sheet 2

INVENTOR.
BENJAMIN RABINOVICI
BY John V. Regan
ATTORNEY

United States Patent Office 3,127,525
Patented Mar. 31, 1964

3,127,525

CASCADED TUNNEL DIODES WITH MEANS TO APPLY ADVANCE AND RESET PULSES TO DIFFERENT TERMINALS

Benjamin Rabinovici, Rego Park, N.Y., assignor to Radio Corporation of America, a corporation of Delaware Filed July 14, 1961, Ser. No. 124,202
14 Claims. (Cl. 307—88.5)

This invention relates to shift circuits such as shift registers, ring counters, and the like.

Shift circuits are used in information handling systems for storing information, converting information from serial to parallel form (and vice versa), counting and the like. Shift circuits of this type generally include a chain of bistable storage stages connected in cascade. The two stable states of a storage stage may represent, respectively, a binary "1" and a binary "0." It is desirable that the individual stages and components used therein operate at high speed both in response and recovery time. It is also desirable that they be reliable in operation and have low power requirements.

It is a general object of the present invention to provide an improved shift circuit.

It is another object of the invention to provide an improved shift circuit capable of high speed operation.

It is still another object of the invention to provide an improved shift circuit which is reliable in operation and which has low power requirements.

These and other objects are accomplished according to the invention by a cascaded plurality of tunnel diode stages which are biased to operate stably in either an initial "0" state or a switched "1" stage. Each stage is coupled to an adjacent stage by means including a unilateral conducting device which conducts when the coupled stages are in select, opposite stable states. Input binary signals may be applied to, and stored in, the tunnel diode stages. The stored information is shifted selectively, on command, by applying advance and reset pulses to the odd and even numbered stages, respectively, and advance and reset pulses to the even and odd numbered stages, respectively, in that order.

In the accompanying drawing, like reference characters denote like components, and:

A tunnel diode is a negative resistance device having a volt-ampere characteristic including a low voltage region of positive resistance and a high voltage region of positive resistance separated by a region of negative resistance. A tunnel diode can be biased so that it has two stable operating points, one in the positive resistance region of low voltage and one in the positive resistance region of high voltage. The first mentioned stable operating point may represent storage of a binary "0" information bit and the other stable operating point may represent storage of a binary "1" information bit. A tunnel diode has the advantage over other known two-state devices in that it can be switched more rapidly from one stable state to the other state in response to an input signal of the proper polarity and amplitude.

Figures 1, 2:
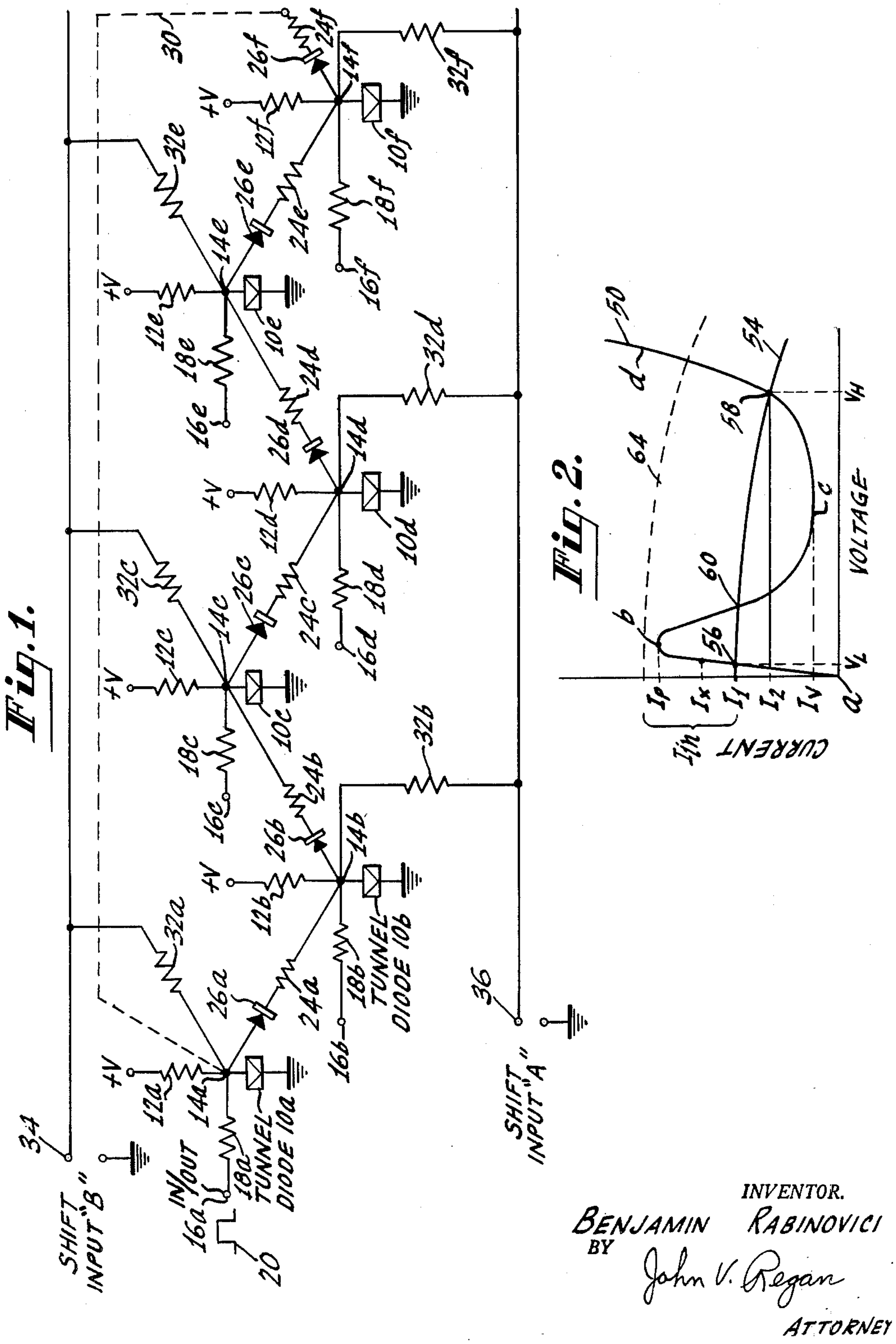
FIGURE 1 is a schematic diagram of one embodiment of the improved shift circuit according to the invention.
FIGURE 2 is a typical volt-ampere characteristic of a tunnel diode useful in explaining the operation of the shift circuit.

One example of a shift circuit according to the present invention is illustrated schematically in FIGURE 1. The circuit, as illustrated, includes six tunnel diode stages connected in cascade. More or less stages may be used as circumstances dictate in a particular application.

Each of the tunnel diodes 10*a* . . . 10*f* has its cathode connected to a point of reference potential, illustrated in the drawing by the conventional symbol for circuit ground. The anode of each of the diodes is connected to a biasing source of substantially constant current. The tunnel diode 10*a* in the first stage, for example, has its anode connected by way of a resistor 12*a* to a source of biasing potential, designated +V. This voltage source and the resistor 12*a* are selected in value to supply a substantially constant current $I_1$ to the junction point 14*a* at the anode of the diode 10*a*. The first stage also has a common input-output terminal 16*a* which is connected to the junction point 14*a* by means of a resistor 18*a*. Input signals 20 may be applied at the terminal 16*a*. The input pulse 20 has an amplitude sufficient to switch the tunnel diode 10*a* from the low voltage state to the high voltage state, as will be described more fully hereinafter in connection with the operation of the shift circuit.

Each tunnel diode is connected to the next succeeding tunnel diode in the shift circuit by the series combination of a unidirectional conducting device and a resistor. The anode of tunnel diode 10*a*, for example, is connected to the like terminal of tunnel diode 10*b* by way of a series combination of a resistor 24*a* and a diode 26*a*. The diode 26*a* is poled in the direction of easy current flow with respect to current, in the conventional sense, flowing from the junction point 14*a* to the junction point 14*b* at the anode of the tunnel diode 10*b*. The voltages at the junction points 14*a* and 14*b* are the same when both of the tunnel diodes 10*a* and 10*b* are operating in the same stable state. No current flows in the transfer path and through the diode 26*a* under these conditions. If the tunnel diode 10*a* is in the high voltage state and the tunnel diode 10*b* is in the low voltage operating state, the voltage difference between the points 14*a* and 14*b* is of a polarity to forward bias the diode 26*a*, and a portion of the constant current supplied at the junction point 14*a* then flows through the diode 26*a* and the tunnel diode 10*b*. This feature will be described more fully hereinafter.

Each of the tunnel diode stages is structurally the same as that of the first stage described above except for the shift pulse input circuit to be described. Also, the interstage transfer means are structurally the same and will not be described further. The transfer means comprising the diode 26*f* and series resistor 24*f*, at the output of the last tunnel diode stage, may be connected to the input of another stage (not shown) if more than six stages are present in the shift circuit. The circuit may be operated as a ring counter, for example, by connecting the free end of the last mentioned transfer means to the junction point 14*a* in the first stage, as indicated by the dashed connecting line 30.

The anodes of the odd numbered tunnel diodes 10*a*, 10*c* and 10*e*, counting from the left in FIGURE 1, are connected by way of individual resistor elements 32*a*, 32*c* and 32*e*, respectively, to a common input terminal 34. Shift input pulses, designated "shift input B" are applied between the input terminal 34 and ground. The anodes of the even numbered tunnel diodes 10*b*, 10*d* and 10*f*, are connected by way of individual resistor elements 32*b*, 32*d* and 32*f*, respectively, to a common terminal 36. Shift input pulses, designated "shift input A," are applied between the terminal 36 and ground. The shift pulse input sequence, illustrated in FIGURE 3, the first two rows thereof, comprises pairs of positive advance and negative reset pulses. The first, third and other odd numbered pulse pairs, reading from the left, consist of a positive advance pulse 38 applied at the shift terminal 34 followed by a negative reset pulse 40 applied at the shift terminal 36. The second, fourth and other even numbered pairs of shift pulses consist of a positive advance pulse 42 applied at the shift terminal 36 followed by a negative reset pulse 44 applied at the shift terminal 34. The even numbered pairs of shift pulses are interlaced with the odd numbered pairs, and each of the pulses of a pulse pair may partialy overlap in point of time. That is to say, the reset pulse, pulse 40*a* for example, may commence before the corresponding advance pulse, pulse 38*a* for example, terminates. Each pair or set of shift pulses operates to shift the stored information one stage to the right, as viewed in FIGURE 1.

Curve 50 of FIGURE 2 is a typical volt-ampere characteristic of a tunnel diode. Portions *ab* and *cd* are regions of positive resistance. The region *bc* is a region of negative resistance. The individual current sources for the tunnel diode stages supply a substantially constant current $I_1$ at the junction points 14*a* . . . 14*f*. The load as seen between any of these junction points and ground has the characteristic indicated in FIGURE 2 by the solid line 54. The curve in this load line 54 is due primarily to the conduction of the diode in the transfer means when the voltage across the tunnel diode to the left of the transfer means is increased in a positive sense. The load line 54 intersects the tunnel diode characteristic 50 at points 56 and 58 in the positive resistance regions and at a point 60 in the negative resistance region. Only the points 56 and 58 are stable operating points for a tunnel diode stage. A tunnel diode has a low voltage $V_L$ and a high current $I_1$, relatively speaking, when the diode operating condition is defined by the point 56, and has a high voltage $V_H$ and a low current $I_2$, relatively speaking, when the operating state of the tunnel diode is defined by the operating point 58. A tunnel diode may be considered to store a binary "0" when it is operating in the stable, low voltage region, point 56 for example, and a binary "1" when it is operating in the stable, high voltage region, point 58 for example. A tunnel diode may be switched, or set, from the low voltage state to the high voltage state by increasing the diode current to exceed the peak current $I_p$. That is to say, the tunnel diode may be switched to the high voltage state by increasing the tunnel diode current an amount greater than $I_p - I_1$. In like manner, a diode may be reset, or switched from the high voltage state to the low voltage state, by decreasing the diode current an amount greater than $I_2 - I_V$, where $I_V$ is the valley current of the tunnel diode.

As will be apparent hereinafter, the tunnel diodes 10*a*, 10*c* and 10*e* in the odd numbered stages and the tunnel diodes 10*b*, 10*d* and 10*f* in the even numbered stages cannot all be in the set state at the same time. To provide a shift register for storing *n* bits of information, therefore, at least $2n-1$ tunnel diode stages are required. N alternate stages are then used as main storage stages and the remaining, intermediate stages are used for temporary storage. Consider now the operation of the FIGURE 1 circuit as a shift register and assume that the odd numbered stages serve as the main storage stages.

Figure 3:
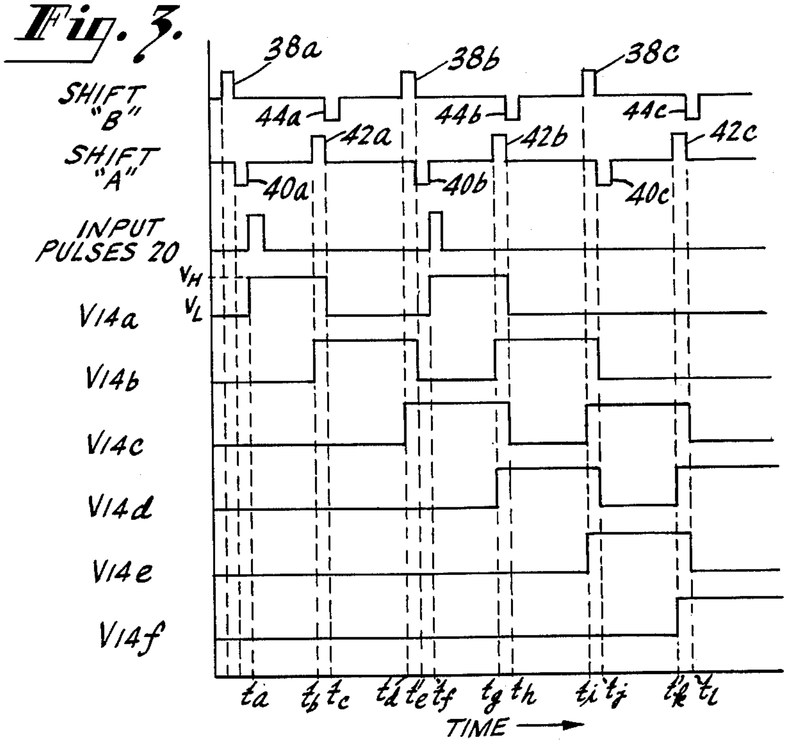
FIGURE 3 is a set of waveforms which will be referred to in describing the operation of the shift circuit.

Operation of the circuit may best be understood by way of an illustrative example and will be described with reference to the waveforms of FIGURE 3. All of the diode stages initially are in the reset or "0" state. The voltages at all of the junction points 14*a* . . . 14*e* then are $V_L$ volts, the current through each of the various tunnel diodes is $I_1$, and no current flows in any of the transfer means. In FIGURE 3, the designations "$V_{14a}$," etc. along the vertical axis have the meaning "voltage between junction 14*a* and ground," etc.

A first input pulse 20 is applied at the input terminal 16*a* of the first stage at time $t_a$. This input pulse 20 supplies a current to the junction point 14*a* which is greater than the quantity $I_p - I_1$. The current through the tunnel diode 10*a* increases above the peak value $I_p$, and the tunnel diode 10*a* switches rapidly through the negative resistance region to a condition of high voltage. This current pulse 20 has the effect of raising the load line on the diode characteristic 50 to the position indicated by the dashed line 64 (FIGURE 2). The current through the tunnel diode 10*a* decreases to a value $I_2$ when the input pulse 20 is terminated and after the switching transient. The voltage across the tunnel diode 10*a* then is $V_H$ volts. This voltage is sufficient to forward bias the diode 26*a* in the transfer means between the tunnel diode 10*a* and the tunnel diode 10*b*, and a current $I_1 - I_2$ flows through the diode 26*a* to the junction point 14*b*. This current is taken up by the tunnel diode 10*b* in the second stage. The current through the tunnel diode 10*b* then is $I_X = 2I_1 - I_2$. The voltage across the tunnel diode 10*b* remains substantialy unchanged, as may be seen from FIGURE 2, inasmuch as the additional current supplied to the tunnel diode 10*b* is insufficient to switch this tunnel diode to the high voltage state.

A positive advance pulse 42*a* is applied at the input terminal 36 at time $t_b$. This advance pulse 42*a* supplies a current greater than $I_p - I_X$ and less than $I_p - I_1$ at all of the junction points 14*b*, 14*d* and 14*f* of the even numbered stages. This advance pulse 42*a* increases the current through the tunnel diode 10*b* above the peak current $I_p$ and causes this tunnel diode 10*b* to switch to the high voltage state. The tunnel diodes 10*d* and 10*f* in the other even numbered stages do not switch because these tunnel diodes are receiving no current by way of their associated transfer means. Stated in another way, the tunnel diodes 10*d* and 10*f* do not switch because the next preceding stages 10*c* and 10*e*, respectively, are in the reset state. It is thus seen that a positive advance pulse applied at the anode of a tunnel diode causes that tunnel diode to assume the operating state of the next preceding tunnel diode stage. A negative reset pulse 44*a* is applied at the input terminal 34 at time $t_c$ and is of sufficient amplitude to reset all of the odd numbered tunnel diode stages. In this example, only the first tunnel diode 10*a* is reset by the negative pulse 44 since the tunnel diodes 10*c* and 10*e* in the other odd numbered stages already are in the reset state. The advance pulse 42*a* and the reset pulse 44*a* may partially overlap. It is only necessary that the advance pulse 42*a* be applied for a sufficient time to set the tunnel diode 10*b* before the negative reset pulse 44*a* is applied to reset the tunnel diode 10*a*. Only the tunnel diode 10*b* is in the high voltage, or set, state following the reset pulse 44*a* at $t_c$.

The next positive advance pulse 38*b* is applied at the terminal 34 at time $t_d$ and has the effect of causing each of the odd numbered stages to assume the operating state of the next preceding one of the even numbered stages. The current through the third tunnel diode 10*c* is $I_X$ during the period prior to $t_d$ because of the current flow through the transfer means comprising the resistor 24*b* and the diode 26*b*. The advance pulse 38*b* applied at $t_d$ increases the current through the tunnel diode 10*c* above the peak $I_p$ and switches the diode 10*c* to the set state. A negative reset pulse 40*b* is applied at the terminal 36 at $t_e$ and resets the tunnel diode 10*b*. Only the third tunnel diode 10*c* is then in the set state. A second input pulse 20 is applied at the input terminal 16*a* of the first stage at $t_f$. This input pulse 20, as described previously, supplies a current increment greater than $I_p - I_1$ at the junction point 14*a* and switches the first tunnel diode 10*a* to the set state.

The next positive advance pulse 42*b* is applied at the shift terminal 36 at $t_g$ and causes each of the even numbered stages to assume the operating state of the next preceding odd numbered stage. Since the tunnel diodes 10*a* and 10*c* then are in the set state, this advance pulse 42*b* switches the tunnel diodes 10*b* and 10*d* to the set state. The tunnel diode 10*f* remains in the reset state because no current is being supplied at the junction point 14*f* by way of the input transfer means. The advance pulse 42*b* is followed by a negative reset pulse 44*b* applied to the shift terminal 34 at $t_h$. This reset pulse 44*b* resets the tunnel diodes 10*a* and 10*c*. Only the tunnel diodes 10*b* and 10*d* then remain in the set state.

Each advance and reset pulse pair is effective in shifting the stored information one position to the right in the shift circuit. The information is shifted from the odd numbered, main stages to the next succeeding even numbered, temporary storage stages when the advance pulse is applied at the shift terminal 36. Conversely, the advance pulses shift the information from the even numbered stages to the next succeeding odd numbered stages when the advance pulses are applied at the shift terminal 34. Information entered into the first tunnel diode 10*a* stage reaches the last illustrated stage 10*f* after five advance pulses. In FIGURE 3, the advance pulse 42*c* is the fifth advance pulse following the first information input pulse 20 entered into the first stage $t_a$. This pulse 42*c* switches the tunnel diode 10*f* to the high voltage, set state. Information may be read out of the shift circuit in parallel form by sampling the outputs at the terminals 16*a*, 16*c* and 16*e* or the terminals 16*b*, 16*d* and 16*f*. The shift circuit also may be operated as a parallel-to-serial shift register by entering information into the register in parallel by applying information input pulses at the input terminals 16*a*, 16*c* and 16*e* or the terminals 16*b*, 16*d* and 16*f*. The information may then be read out serially from the last stage 10*f* as advance and reset signals are applied at the terminals 34 and 36.

The FIGURE 1 circuit also may operate as a ring counter, as described previously, by connecting the tunnel diode 10*f* in the last stage to the tunnel diode 10*a* in the first stage by way of the transfer means comprising the resistor 24*f*, diode 26*f* and dashed connecting line 30. Only one stage of the shift circuit may be in the set state when the circuit is operated as a ring counter. Accordingly, the six stages illustrated may function as a six-position ring counter, and outputs from the counter may be derived at any or all of the common input-output terminals 16*a* . . . 16*f*.

Figure 4:
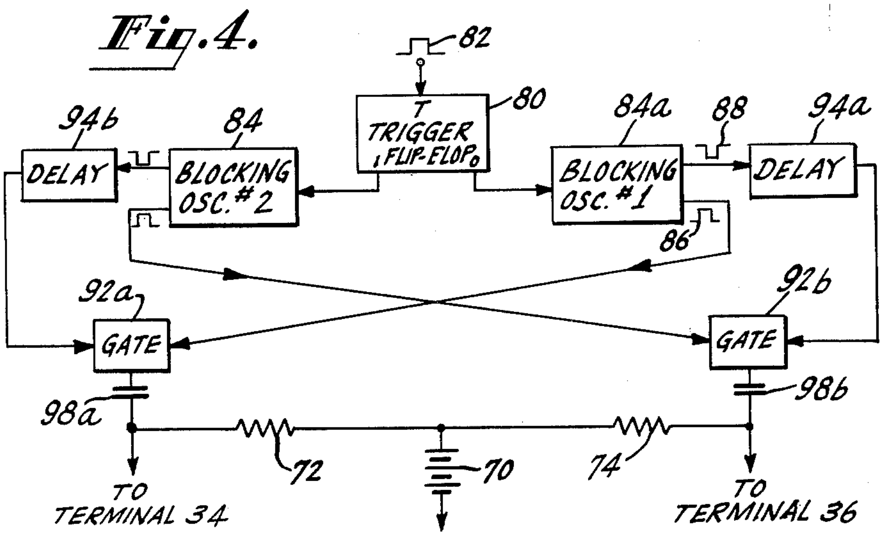
FIGURE 4 is a block diagram of one arrangement for supplying the advance and reset pulses on command.

Although individual biasing sources have been illustrated for each of the tunnel diodes 10*a* . . . 10*f* in FIGURE 1, it will be apparent that other biasing arrangements also may be used without departing from the spirit of the invention. FIGURE 4 is a partial block diagram of an arrangement for biasing the tunnel diodes 10*a* . . . 10*f* and for supplying the advance and reset pulse pairs on command. When this arrangement is used in conjunction with the FIGURE 1 shift circuit, the voltage sources +V and resistors 12*a* . . . 12*f* of FIGURE 1, comprising the constant current sources, are unnecessary and are replaced by the single voltage source 70 and resistors 72, 74 (FIGURE 4). The combination of the battery 70 and resistor 72 provides a substantially constant current of magnitude $3I_1$ at the shift terminal 34. In like manner, the battery 70 and resistor 74 combination supplies a constant current of magnitude $3I_1$ at the shift terminal 36. The constant current supplied at each of the shift terminals 34 and 36 is distributed equally among the tunnel diode stages connected thereto, a current $I_1$ being supplied to each of the tunnel diodes 10*a* . . . 10*f*.

The apparatus for supplying the advance and reset pulses includes a triggerable flip-flop 80. This flip-flop 80 has a trigger (T) input terminal and (1) and (0) output terminals. A triggerable flip-flop, as is known, is a bistable device which is switched from one operating state to the other in response to an input signal 82 applied at the trigger (T) input terminal. The output at the (1) terminal of the flip-flop 80 is the complement of the output at the (0) terminal. That is to say, when the output at the (1) terminal is high, the output at the (0) terminal is low, relatively speaking, and vice versa. The outputs change condition in response to each applied trigger pulse 82.

The (0) output terminal of the flip-flop 80 is connected to the input of a first blocking oscillator 84*a*. The blocking oscillator 84*a* is one which provides both a positive and a negative-going output pulse 86, 88, respectively, when triggered. The oscillator may be, for example, one of the general type illustrated at page 202, FIGURE 197 of the Technical Manual No. 11–690 entitled, "Basic Theory and Application of Transistors" and published by the Department of the Army. When the blocking oscillator 84*a* is of the type illustrated in said FIGURE 197, the secondary winding of the transformer may be center-tapped, and a pair of diodes connected back-to-back between the center-tap and each end of the secondary winding to provide the positive and negative output pulses. The positive output pulse 86 is supplied to one input of a gate 92*a*. The negative pulse 88 is supplied through a delay device 94*a* to one input of a second gate 92*b*. The delay device 94*a* may be any suitable means for delaying the signal, for example a lumped constant RC delay line. The gates 92*a* and 92*b* are ones which provide a positive output pulse in response to a positive input pulse, and a negative output pulse in response to a negative input pulse. Various types of bidirectional amplifiers are known which perform this function. By way of example, the gates 92*a*, 92*b* each may be a balanced pair tunnel diode circuit of the type illustrated and described in the Belgian Patent No. 586,900.

The (1) output terminal of the flip-flop 80 is connected to the input of a second blocking oscillator 84*b* of the type described above. The negative output of the blocking oscillator 84*b* is fed through a delay device 94*b* to a second input of the gate 92*a*. The positive output of the oscillator 84*b* is supplied to a second input of the gate 92*b*. The outputs of the gates 92*a*, 92*b* are applied at the shift terminals 34 and 36, respectively, by way of coupling capacitors 98*a*, 98*b*, respectively.

Operation of the FIGURE 4 circuit will now be described. The battery 70 and resistors 72 and 74 supply the constant current described previously. No outputs are provided by the gates 92*a* and 92*b* in the absence of a trigger input 82 to the flip-flop 80, whereby the shift circuit of FIGURE 1 is ordinarily operated in a quiescent condition. Assume that the flip-flop 80 is in the reset state, the (1) output is high, relatively speaking, and that the blocking oscillators 84*a*, 84*b* are triggered by negative-going signals. The first applied trigger pulse 82 sets the flip-flop 80. The (1) output then goes low and triggers the blocking oscillator 84*b*. The positive output thereof is passed by the gate 92*b* and supplied as a positive advance pulse at the shift terminal 36. After a short delay, the negative pulse output of the oscillator 84*b* is passed by the gate 92*a* as a negative reset pulse to the shift terminal 34. The next applied trigger pulse 82 triggers the flip-flop to the reset state. The (0) output goes low and triggers the first blocking oscillator 84*a*. The positive output pulse 86 is passed by the gate 92*a* and applied as a positive advance pulse at the shift terminal 34. The negative output pulse 88 of the oscillator 84*a* is delayed in the device 94*a* and then passed by the gate 92*b* as a negative reset pulse to the shift terminal 36.

In certain applications it may be desirable to provide individual constant current sources for the individual tunnel diodes 10*a* . . . 10*f*. In this event, the individual current sources of FIGURE 1, for example, resistor 12*a* and voltage source +V, may be retained, and the battery 70 and resistors 72 and 74 eliminated from the FIGURE 4 circuit. The shift pulse supply arrangement of FIGURE 4 is by way of illustration only, and it will be understood that other suitable arrangements for supplying the advance and reset pulse pairs may be used with the FIGURE 1 circuit.

What is claimed is:

1. A plurality of bistable storage stages each having stable set and reset operating states; means including unidirectional conducting devices connecting said stages in cascade; means for applying information input signals to at least one of said stages for setting said one of said stages; and information shift means applying advance and then reset pulses to all of the even and odd numbered ones of said stages, respectively, followed by advance and then reset pulses to all of said odd and even numbered stages, respectively.

2. A plurality of bistable storage stages each having stable set and reset operation states; means including unidirectional conducting devices connecting said stages in cascade; means for applying information input signals to at least one of said stages for setting said one of said stages; and information shift means selectively applying advance and reset pulses to the odd and even numbered ones of said stages in the following sequence: advance pulses to all even numbered stages, reset pulses to all odd numbered stages, advance pulses to all odd numbered stages, and then reset pulses to all even numbered stages.

3. The combination comprising: a plurality of bistable tunnel diode stages each having stable set and reset operating states; a plurality of unidirectional device and resistor series combinations each connected between a different pair of stages; means for applying information input signals to at least one of said stages for setting said one of said stages; and information shift means selectively applying advance and reset pulses to the odd and even numbered ones of said stages in the following sequence: advance pulses to all even numbered stages, reset pulses to all odd numbered stages, advance pulses to all odd numbered stages, and then reset pulses to all even numbered stages.

4. The combination comprising: a plurality of tunnel diodes; means biasing each of said diodes for bistable operation, wherein each of said diodes has a stable set and a stable reset operating state; translating means including unidirectional conducting devices connecting said diodes in cascade; means for applying information signals to at least one of said diodes for setting said one of said diodes; and information shift means applying advance and then reset pulses to all of the even and odd numbered ones of said diodes, respectively, followed by advance and reset pulses to all of said odd and even numbered ones of said diodes, respectively, in the order named.

5. The combination comprising: a plurality of tunnel diodes; means biasing each of said diodes for bistable operation wherein each of said diodes has a stable set and a stable reset operating state; translating means including unidirectional conducting devices connecting said diodes in cascade, each of said devices being connected so as to be forward biased whenever the next succeeding one of said diodes is in the reset state and the next preceding one of said diodes is in the set state; means for applying information signals to at least one of said diodes for setting said one of said diodes; and information shift means applying advance and reset pulses to the odd and even numbered ones of said diodes in the following sequence: advance pulses to all even numbered diodes, reset pulses to all odd numbered diodes, advance pulses to all odd numbered diodes, and then reset pulses to all even numbered diodes.

6. The combination comprising: a plurality of tunnel diodes; means biasing each of said diodes for bistable operation, wherein each of said diodes has a stable set and a stable reset operating state; translating means including unidirectional conducting devices connecting said diodes in cascade; means for applying information signals to at least one of said diodes; and information shift means applying advance and then reset pulses to all of the even and odd numbered ones of said diodes, respectively, and advance and then reset pulses to all of said odd and even numbered ones of said diodes, respectively, in the order named, each pair of said advance and reset pulses partially overlapping each other in point of time.

7. The combination comprising: a plurality of tunnel diodes; means biasing each of said diodes for bistable operation, wherein each of said diodes has a stable set and a stable reset operating state; translating means including unidirectional conducting devices connecting said diodes in cascade; means for applying information signals to at least one of said diodes for setting said one of said diodes; and information shift means applying advance and then reset pulses to all of the even and odd numbered ones of said diodes, respectively, and advance and then reset pulses to all of said odd and even numbered ones of said diodes, respectively, in the order named, said advance pulses applied to said odd numbered diodes being of sufficient magnitude to cause each of said odd numbered stages to assume the operating state of the next preceding one of said even numbered diodes and said advance pulses applied to said even numbered diodes being of sufficient magnitude to cause each of said even numbered diodes to assume the operating state of the next preceding one of said odd numbered diodes.

8. The combination comprising: a plurality of tunnel diodes; means biasing each of said diodes for bistable operation, wherein each of said diodes has a stable set and a stable reset operating state; translating means including unidirectional conducting devices connecting said diodes in a closed ring; means for applying information signals to at least one of said diodes for setting said one of said diodes; and information shift means applying advance and reset pulses to the odd and even numbered ones of said diodes in the following sequence: advance pulses to all of said even numbered diodes, reset pulses to all of said odd numbered diodes, advance pulses to all of said odd numbered diodes, and then reset pulses to all of said even numbered diodes.

9. The combination comprising: a plurality of tunnel diodes; means biasing each of said diodes for bistable operation, wherein each of said diodes has a stable set and a stable reset operating state; translating means including unidirectional conducting devices connecting said diodes in cascade; means for applying information signals to at least one of said diodes for setting said one of said diodes; information shift means applying advance and reset pulses to the odd and even numbered ones of said diodes in the following sequence: advance pulses to all even numbered diodes, reset pulses to all odd numbered diodes, advance pulses to all odd numbered diodes, and then reset pulses to all even numbered diodes; and output means connected to selected ones of said tunnel diodes.

10. The combination comprising: a plurality of tunnel diodes; substantially constant current means biasing each of said diodes for bistable operation, wherein each of said diodes has a stable set and a stable reset operating state; translating means including unidirectional conducting devices connecting said diodes in cascade; means for applying information signals to at least one of said diodes for setting said one of said diodes; and information shift means applying advance and reset pulses to the odd and even numbered ones of said diodes in the following sequence: advance pulses to all even numbered diodes, reset pulses to all odd numbered diodes, advance pulses to all odd numbered diodes and then reset pulses to all even numbered diodes.

11. The combination comprising: a plurality of bistable tunnel diode stages connected in cascade and each having a first stable state characterized by low voltage and high current $I_1$, relatively speaking, and a second stable state characterized by high voltage and low current $I_2$, relatively speaking, each tunnel diode having a peak current $I_p$ and a valley current $I_v$; a plurality of unidirectional conducting devices each connecting two like terminals of a different pair of said tunnel diodes and each being connected to pass a current $I_1-I_2$ from one diode to the next succeeding diode when said one diode is in the second stable state and said next succeeding diode is in said first stable state; means for applying a binary input signal to at least one of said stages of sufficient amplitude to cause that stage to switch to the said second stable state; and means for applying advance and reset pulses to said stages in the following order: advance pulses to all even numbered stages, reset pulses to all odd numbered stages, advance pulses to all odd numbered stages, and then reset pulses to all even numbered stages, each advance pulse having a first polarity and an amplitude greater than $I_p-(2I_1-I_2)$ and less than $I_p-I_1$, each reset pulse having the opposite polarity and an amplitude greater than $I_2-I_v$.

12. The combination comprising: a plurality of bistable tunnel diode stages connected in cascade and each having a first stable state characterized by low voltage and high current, relatively speaking, and a second stable state characterized by high voltage and low current, relatively speaking; a plurality of unidirectional conducting devices each connecting two like terminals of a different pair of said tunnel diodes; means for applying a binary input signal to at least one of said stages of sufficient amplitude to cause that stage to switch to the said second stable state; and information shift means for applying advance and reset pulses to the odd and even numbered diodes in the following sequence: advance pulses to all even numbered diodes, reset pulses to all odd numbered diodes, advance pulses to all odd numbered diodes and reset pulses to all even numbered diodes in that order, said advance pulses having a magnitude sufficient to switch a tunnel diode from said first stable state to said second stable state only when the said unilateral conducting device connected between that diode and the next preceding diode is forward biased.

13. The combination comprising: a plurality of tunnel diodes; means biasing each of said tunnel diodes for bistable operation, wherein each diode has a stable set state and a stable reset state; means connecting said tunnel diodes in a cascaded chain, each said means consisting of a resistor and a unidirectional conducting device connected in series between like terminals of a different pair of tunnel diodes; means for applying information input signals to at least one of said tunnel diodes; and information shift means selectively applying advance and reset pulses to the tunnel diodes in the following sequence: advance pulses to all even numbered stages, reset pulses to all odd numbered stages, advance pulses to all odd numbered stages and reset pulses to all even numbered stages.

14. The combination comprising: a plurality of tunnel diodes; substantially constant current means biasing each of said tunnel diodes for bistable operation, whereby each tunnel diode has a stable set state and a stable reset state; means connecting said tunnel diodes in a cascaded chain, each said means consisting of a resistor and a unidirectional conducting device connected in series between a different pair of tunnel diodes; means for applying information input signals to at least one of said tunnel diodes; and information shift means selectively applying advance and reset pulses to the tunnel diodes in the following sequence: advance pulses to all even numbered stages, reset pulses to all odd numbered stages, advance pulses to all odd numbered stages and reset pulses to all even numbered stages.

References Cited in the file of this patent

UNITED STATES PATENTS 3,041,476 Parker ---------------- June 26, 1962

OTHER REFERENCES

Proceedings of the IRE, September 1961; page 1440.